United States Patent
Bradski et al.

(10) Patent No.: US 6,363,160 B1
(45) Date of Patent: Mar. 26, 2002

(54) INTERFACE USING PATTERN RECOGNITION AND TRACKING

(75) Inventors: Gary R. Bradski, Palo Alto; Boon-Lock Yeo; Minerva M. Yeung, both of Sunnyvale, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/235,139

(22) Filed: Jan. 22, 1999

(51) Int. Cl.⁷ .................................................. G06K 9/00
(52) U.S. Cl. ...................................................... 382/103
(58) Field of Search .................................. 382/100, 103, 382/155, 159, 168, 170, 171, 172, 181, 190, 209, 216, 218, 312; 348/77, 169; 345/339, 340, 156, 157

(56) References Cited

U.S. PATENT DOCUMENTS

| | | | |
|---|---|---|---|
| 5,148,477 A | | 9/1992 | Neely et al. ................ 382/107 |
| 5,287,437 A | | 2/1994 | Deering ....................... 345/427 |
| 5,343,390 A | * | 8/1994 | Doi et al. .................... 382/132 |
| 5,394,202 A | | 2/1995 | Deering ......................... 353/7 |
| 5,446,834 A | | 8/1995 | Deering ....................... 345/427 |
| 5,751,836 A | * | 5/1998 | Wildes et al. ............... 382/117 |
| 5,801,704 A | | 9/1998 | Oohara et al. ............... 345/856 |
| 5,802,220 A | | 9/1998 | Black et al. ................. 382/276 |
| 5,805,733 A | * | 9/1998 | Wang et al. ................. 382/232 |
| 5,923,776 A | * | 7/1999 | Kamgar-parsi .............. 382/173 |
| 5,926,568 A | * | 7/1999 | Chaney et al. .............. 382/217 |
| 5,936,610 A | | 8/1999 | Endo ........................... 345/157 |
| 6,009,210 A | | 12/1999 | Kang ........................... 382/276 |
| 6,028,960 A | * | 2/2000 | Graf et al. ................... 382/203 |
| 6,070,003 A | * | 5/2000 | Gove et al. ................. 710/132 |
| 6,097,839 A | * | 8/2000 | Liu .............................. 382/181 |
| 6,111,517 A | | 8/2000 | Atick et al. ................. 340/5.83 |
| 6,127,990 A | | 10/2000 | Zwern ............................ 345/8 |

OTHER PUBLICATIONS

Bradski, G.R., "Computer Vision Face Tracking For Use in a Perceptual User Interface", *Intel Technology Journal Q2*, 1–15, (1998).

Freeman, W., et al., "Computer Vision for Interactive Computer Graphics", *IEEE Computer Graphics and Applications*, pp. 42–53, (May/Jun. 1998).

(List continued on next page.)

*Primary Examiner*—Andrew W. Johns
*Assistant Examiner*—Shervin Nakhjavan
(74) *Attorney, Agent, or Firm*—Schwegman, Lundberg, Woessner & Kluth, P.A.

(57) ABSTRACT

A method for interfacing with an electronic system is provided. The method includes receiving images from a camera. A portion of at least one image from the camera is tracked. A pattern in the tracked portion of the at least one image is recognized. And, the electronic system is controlled based on the recognized pattern.

30 Claims, 19 Drawing Sheets

OTHER PUBLICATIONS

Cheng, Y., "Mean Shift, Mode Seeking, and Clustering", *IEEE Transactions on Pattern Analysis and Machine Intelligence, 17*, Published by the IEEE Computer Society, 790–799, (Aug. 1995).

Comaniciu, D., et al., "Robust Analysis of Feature Spaces: Color Image Segmentation", 1997 IEEE Computer Society Conference on Computer Vision and Pattern Recognition, San Juan, Puerto Rico, 750–755, (Jun. 17–19, 1997).

Cutler, R., et al., "View–based Interpretation of Real–time Optical Flow for Gesture Recognition", Int. Conf. on Automatic Face and Gesture Recognition, 416–421, (1998).

Davis, J.W., et al., "The Representation and Recognition of Human Movement Using Temporal Templates", 1997 IEEE Computer Society Conference on Computer Vision and Pattern Recognition, San Juan, Puerto Rico, 928–934, (Jun. 17–19, 1997).

Fukunaga, K., *Introduction to Statistical Pattern Recognition*, 2nd Edition, Academic Press, Inc., Harcourt Brace Jovanovich, Publishers, (Copyright, 1990).

Funt, B.V., et al., "Color Constant Color Indexing", *IEEE Transactions on Pattern Analysis and Machine Intelligence, 17*, Published by the IEEE Computer Society, 522–529, (May 1995).

Nagao, K., "Recognizing 3D Objects Using Photometric Invariant", Proceedings Fifth International Conference on Computer Vision, Massachusetts Institute of Technology, Cambridge, Massachusetts, 480–487, (Jun. 20–23, 1995).

Smith, A.R., "Color Gamut Transform Pairs", *Computer Graphics: A Quarterly Report of Siggraph–ACM, 12*, 12–19, (Aug. 1978).

Swain, M.J., et al., "Color Indexing", *International Journal of Computer Vision, 7*, 1991 Kluwer Academic Publishers, Manufactured in The Netherlands, 11–32, (1991).

Yeo, B., et al., "Rapid Scene Analysis on Compressed Video", *IEEE Transactions on Circuits and Systems for Video Technology, 5*, A Publication of the Circuits and Systems Society, 533–544, (Dec. 1995).

Yeo, B., et al., "Retrieving and Visualizing Video", *Communications of the ACM, 40*, 43–52, (Nov. 1997).

Yeung, M.M., et al., "Time–constrained Clustering for Segmentation of Video into Story Units", Proceedings of the 13th International Conference on Pattern Recognition, III, Sponsored by The International Association for Pattern Recognition, 375–380, (Aug. 25–29, 1996).

Yeung, M.M., et al., "Video Browsing using Clustering and Scene Transitions on Compressed Squences", *SPIE, 2417*, 399–413, (Feb. 1995).

"Workshop on Perceptual User Interfaces", The Banff Rocky Mountain Resort, Banff, Alberta, Canada http://research.microsoft.com/PUIWorkshop97/, 1 p., (Oct. 20–21, 1997).

Bradski, G.R., et al., "Computer Vision Modules for Game Interfaces and in Virtual Holography", *Workshop on Perceptual User Interfaces*, Banff, Alberta, Canada, pp. 10–13, (Oct. 19–21, 1997).

Cutler, L.D., et al., "Two–Handed Direct Manipulation on the Responsive Workbench", Symposium on Interactive 3D Graphics, pp. 107–114, (1997).

Freeman, W.T., et al., "Computer Vision for Computer Games", Proceddings of the Second International Conference on Automatic Face and Gesture Recognition, Killington, VT, pp. 100–105, (Oct. 14–16, 1996).

Parker, J.R., *Algorithms for Image Processing and Computer Vision*, John Wiley & Sons, Inc., pp. 241–243, (1997).

Ward, M., et al., "A Demonstrated Optical Tracker with Scalable Work Area for Head–Mounted Display System", Proceedings of the Symposium on Interactive 3D Graphics, Cambridge, MA, pp. 43–52, (1992).

* cited by examiner

INTERFACE USING PATTERN RECOGNITION AND TRACKING

TECHNICAL FIELD OF THE INVENTION

The present invention relates generally to the field of user interfaces for electronic systems and, in particular, to an interface using pattern recognition and tracking.

BACKGROUND

Computers and other electronic devices continue to become more commonplace in society. In industry, computers are used in a wide variety of applications from analysis of data for scientific research to word processing in an office setting. The technical ability of the people using this complex equipment runs over a wide range as well; from researchers with doctorates in computer science to the word processor with a high school diploma. Thus, the computer industry constantly strives to develop user interfaces that are easy to use and understand.

For early computers, the interface consisted of punch cards that were fed into the computer to control its operation. Later, keyboards were added to computers to allow commands to be typed into the computer. More recently, the graphical user interface and "mouse" have become popular in allowing the average user to get access to the great potential power of computing.

The interface for other electronic appliances have changed over the years as well. For example, televisions were initially controlled with knobs on the television set to change channels and adjust the video and audio output. Later, remote controls, both wired and wireless, were introduced.

One researcher has experimented with the use of gesture recognition as a user interface for electronic systems. W. T. Freeman, et al., *Orientation Histograms for Hand Gesture Recognition,* Int'l Workshop on Automatic Face and Gesture Recognition, Dept. Of Computer Science, Univ. of Zurich, Zurich, Switzerland, 1995, pp. 296–301. In this experimental system, a user places a hand in a selected orientation or gesture between a camera and a fixed background to input a command into the system. A user of this system is required to keep a hand in a fixed location against a non-textured background for the system to work properly. In this case, there is little advantage in ease of use when compared with using a mouse-type of interface which is tethered to a system by its connecting cable.

For the reasons stated above, and for other reasons stated below which will become apparent to those skilled in the art upon reading and understanding the present specification, there is a need in the art for an improve interface for electronic systems.

SUMMARY

The above mentioned problems with interfacing with electronic systems and other problems are addressed by the present invention and will be understood by reading and studying the following specification. An interface is described which uses tracking to identify a portion of an image and pattern recognition to determine a desired input in the identified portion of the image.

In particular, an illustrative embodiment of the present invention includes a method for interfacing with an electronic system. The method includes receiving images from a camera. A portion of at least one image from the camera is tracked. A pattern in the tracked portion of the at least one image is recognized. And, the electronic system is controlled based on the recognized pattern.

DETAILED DESCRIPTION

Figure 1:
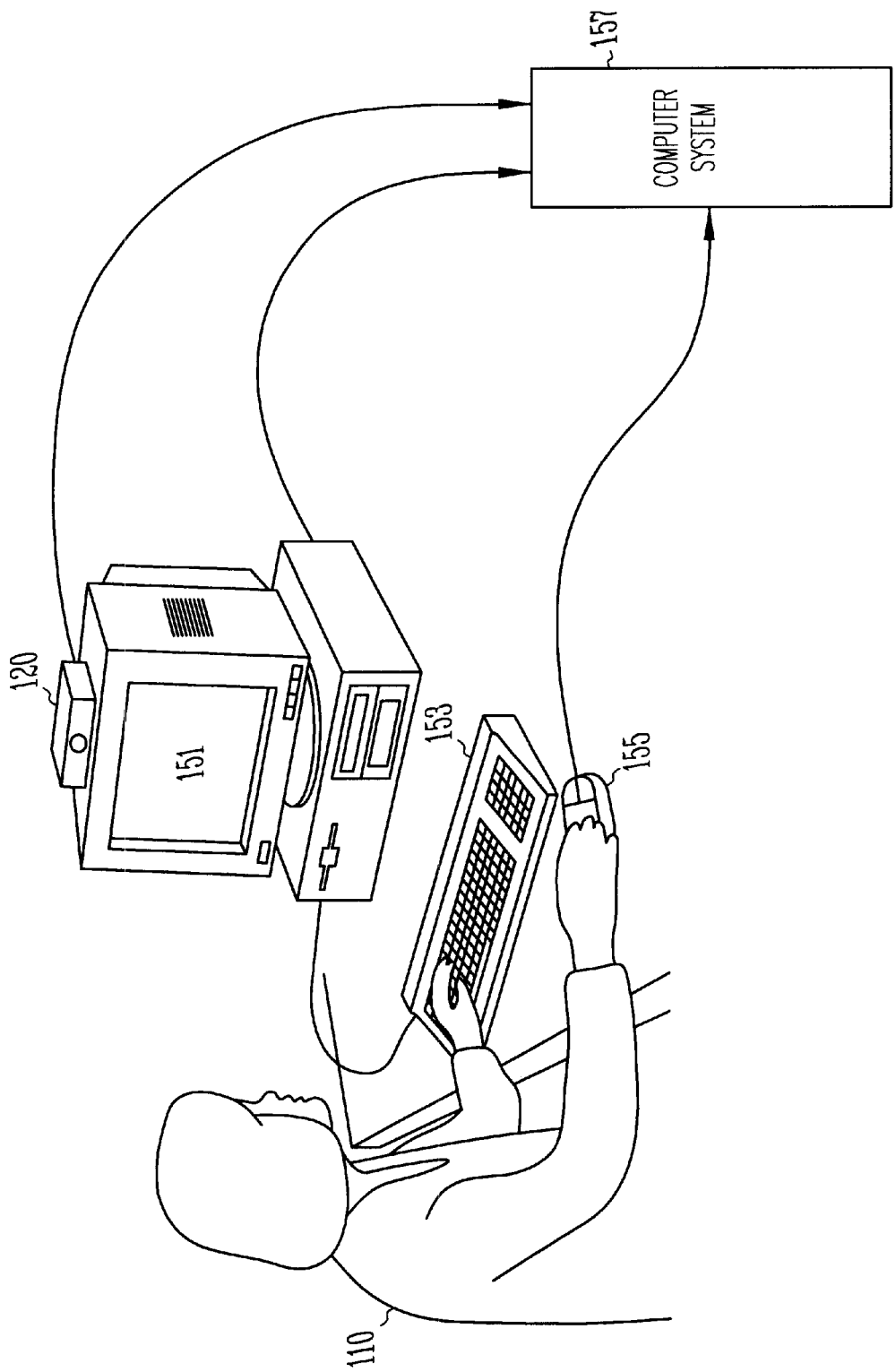
FIG. 1 illustrates an example computer workstation that may use the teachings of the present invention.

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

INTRODUCTION

This application describes embodiments of a gestural or body pose interface using pattern recognition and tracking. An exemplary method and apparatus for tracking a portion of an image is described in Part I below and in co-pending, commonly-assigned U.S. application Ser. No. 09/079,917, entitled Method and Apparatus for Tracking an Object Using A Continuously Adapting Mean Shift, filed on May 15, 1998 (the '917 Application). The '917 Application and Part I below describe a tracking system that returns both the location and size of the tracked portion of the image. Thus, the term tracking, as used in this specification, means identifying the location and size of a selected portion of an image. Other systems for tracking an object in an image can also be used. However, the method of the '917 Application is advantageous in the present application since it allows for a user to interact with the interface in a non-controlled environment. In Part II, a method is described for recognizing patterns in the tracked portion of the image. In Part III, a video navigation system is described.

I. Method and Apparatus for Tracking an Object

A method and apparatus for object tracking using a continuous mean shift method is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an image flesh hue probability distribution. However, the same techniques can easily be applied to other types of dynamically changing probability distributions derived from image object measurements. Also, any other tracking method that reliably tracks the location and size of the human body or parts thereof will work for this interface to an electronic system.

A. The Overall Object Tracking System

A method of tracking objects using a continuously adaptive mean shift method on a probability distribution is disclosed. To simplify the disclosure of the invention, one embodiment is presented wherein a human head is located and tracked within a flesh hue probability distribution created from video image. However, the present invention can easily be used to track other types of objects using other types of probability distribution data. For example, the present invention could be used to track heat emitting objects using an infrared detection system. The present invention can also be used to track objects that are described using non image data such as population distributions.

The disclosed embodiment operates by first capturing a "talking head" video image wherein the head and shoulders of the target person are within the video frame. Next, the method creates a two dimensional flesh hue probability distribution using a preset flesh hue histogram. Then, the location of the target person's head is determined by locating the center of the flesh hue probability distribution. To determine the orientation of the target person's head, the major and minor axis of the flesh hue probability distribution is calculated.

B. Capturing the Data

1. Example Hardware

FIG. 1 illustrates one possible system for using the teachings of the present invention. In the illustration of FIG. 1, a user 110 is seated in front of a video camera 120. The video camera 120 is used to capture a "talking head" image of the user 110. In the embodiment of FIG. 1, the user is using a computer workstation that comprises a visual display monitor 151, a keyboard 153 for alphanumeric input, a mouse 155 for cursor positioning, and a computer system 157.

2. Generating a Flesh Hue Histogram

Figure 2:
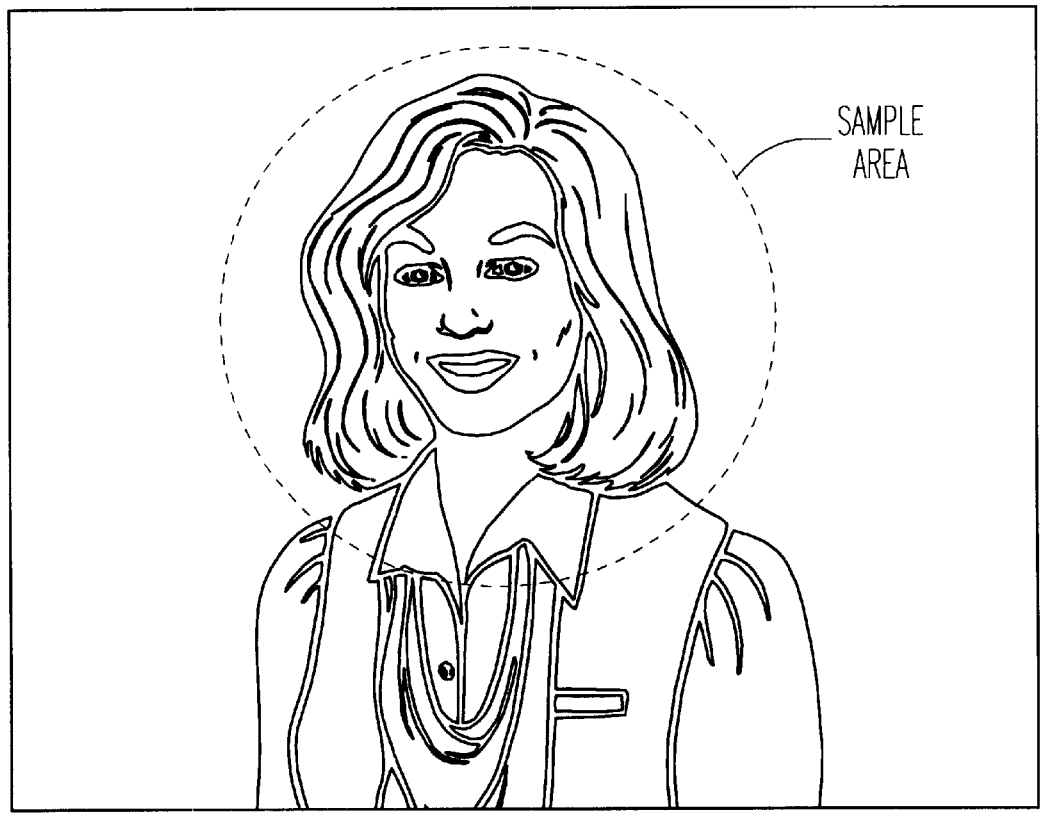
FIG. 2 illustrates a pixel sampling of a human face.

The computer system 157 digitizes the "talking head" image of the user 110 captured by the video camera 120. To build a flesh hue histogram, the user positions himself such that the user's head fills a sample area of an image captured by video camera 120. Specifically, referring to FIG. 2, an image of a "talking head" image is displayed where the user's head substantially or completely fills the sample area. The pixels in the sample area are then used to build a flesh hue histogram.

Figure 3A:
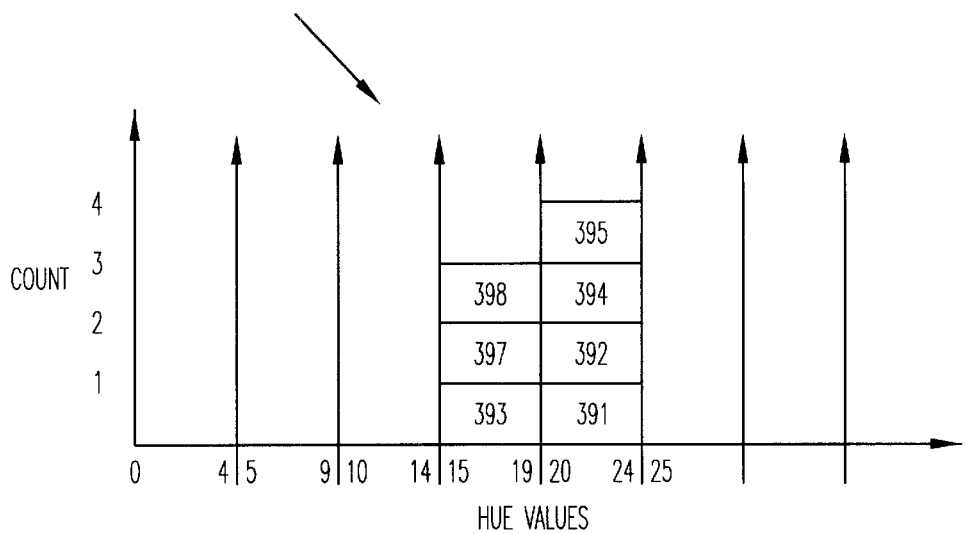
FIG. 3A illustrates a small portion of sample image being converted into a flesh hue histogram.

In one embodiment, each pixel in the video image is converted to or captured in a hue (H), saturation (S), and value (V) color space. Certain hue values in the sample region are accumulated into a flesh hue histogram. FIG. 3A illustrates a small nine by nine pixel block that has been divided into its hue (H), saturation (S), and value (V) components being converted into a flesh hue histogram. In the embodiment of FIG. 3A, the hue values are grouped into bins wherein each bin comprises five consecutive hue values. Hue values are only accumulated if their corresponding saturation (S) and value (V) values are above respective saturation (S) and value (V) thresholds. Referring to the example of FIG. 3A, the S threshold is 20 and the V threshold is 15 such that a pixel will only be added to the flesh hue histogram if the pixel's S value exceeds 20 and the pixel's V value exceeds 15. Starting at the upper left pixel, this first pixel is added to the flesh hue histogram since the pixel's S value exceeds 20 and the pixel's V value exceeds 15. Thus, a marker 391 is added to the 20 to 24 hue value bin. Similarly, the center pixel of the top row will be added to the 20 to 24 hue value bin as illustrated by marker 392. The center pixel of the right most column will not be added to the flesh hue histogram since its Saturation value does not exceed 20.

Figure 3B:
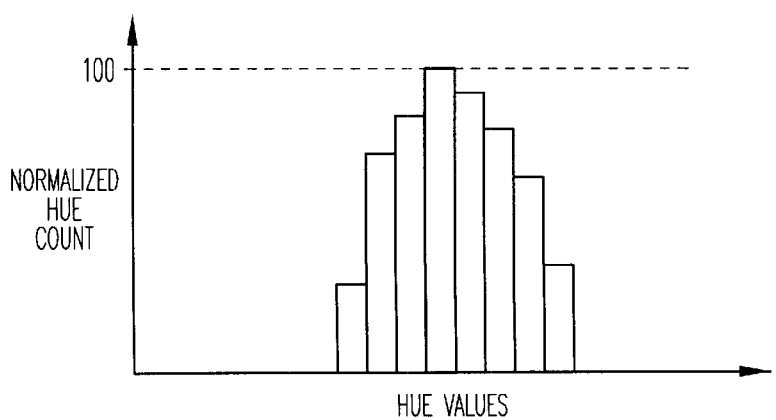
FIG. 3B illustrates a normalized flesh hue histogram created by a sampling a human face.

After sampling all the pixels in the sample area, the flesh hue histogram is normalized such that the maximum value in the histogram is equal to a probability value of one ("1"). In a percentage embodiment of FIG. 3B, all the histogram bins contain flesh hue probability values between zero ("0") and one hundred ("100") as illustrated in FIG. 3B. Thus, in the normalized flesh hue probability histogram illustrated in FIG. 3B, pixel hues that are likely to be flesh hues are given high percentage values and pixel hues that are not likely to be flesh hues are given low probability values.

3. Generating a Flesh Hue Probability Images

Figure 4:
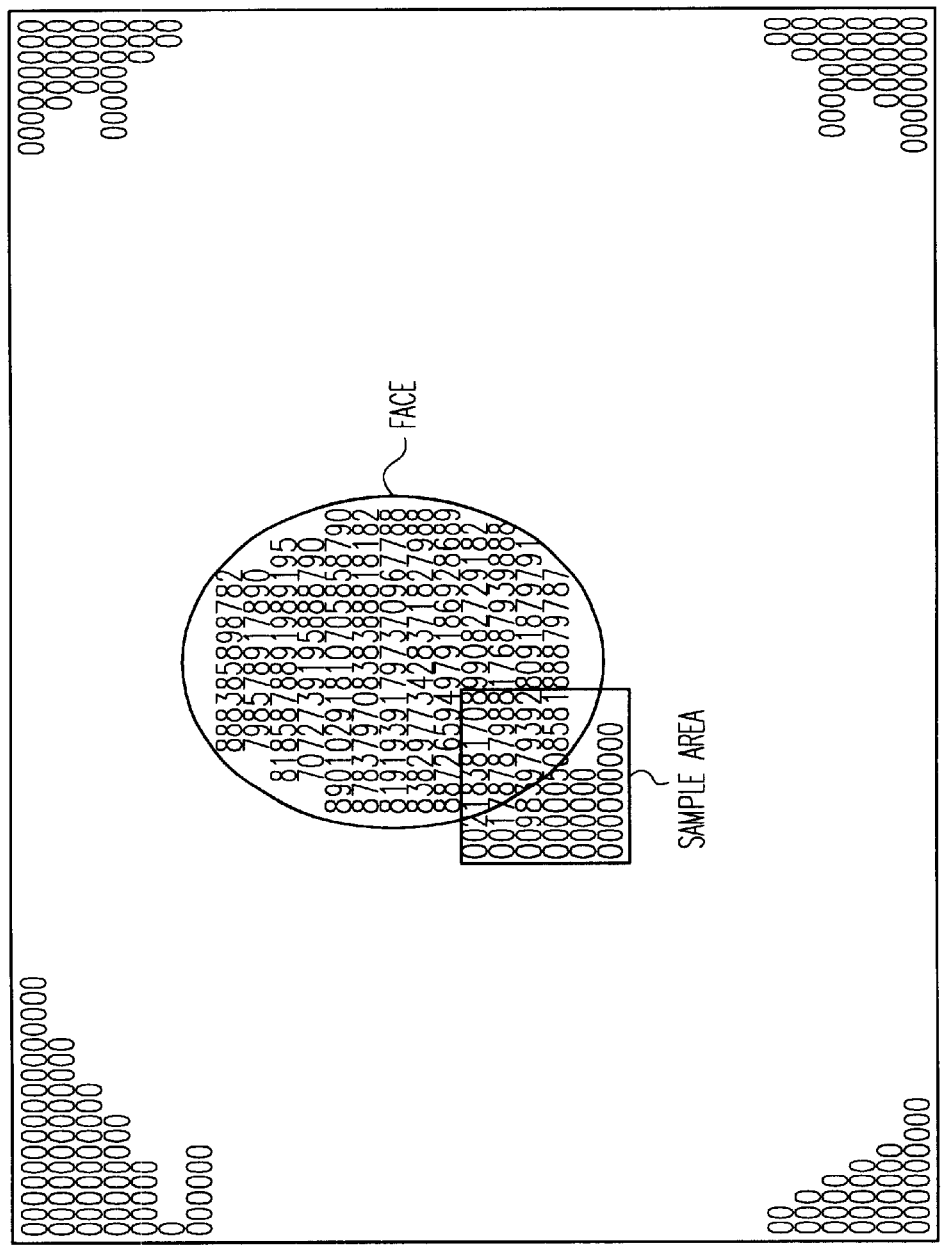
FIG. 4 illustrates a probability distribution of flesh hues of an input image.

Once a flesh hue probability histogram has been created, the computer system 157 can quickly convert video images captured from the video camera into flesh hue probability distributions. This is performed by replacing the pixels in a video image with their respective flesh hue probability values by using the flesh hue histogram of FIG. 3B as a look up table. FIG. 4 illustrates an example of a two dimensional image of a talking head wherein the pixels have been replaced with a percentage probability value that specifies the probability of the pixel being flesh. As apparent in FIG. 4, the pixels that comprise the person's face are given high probabilities of being flesh.

C. Object Tracking Using Mean shift

Once a probability distribution has been created, the teachings of the present invention can be used to locate the center of an object and to track the object. An early embodiment of the present invention uses a standard mean shift method to track objects that have been converted into probability distributions.

Figure 5:
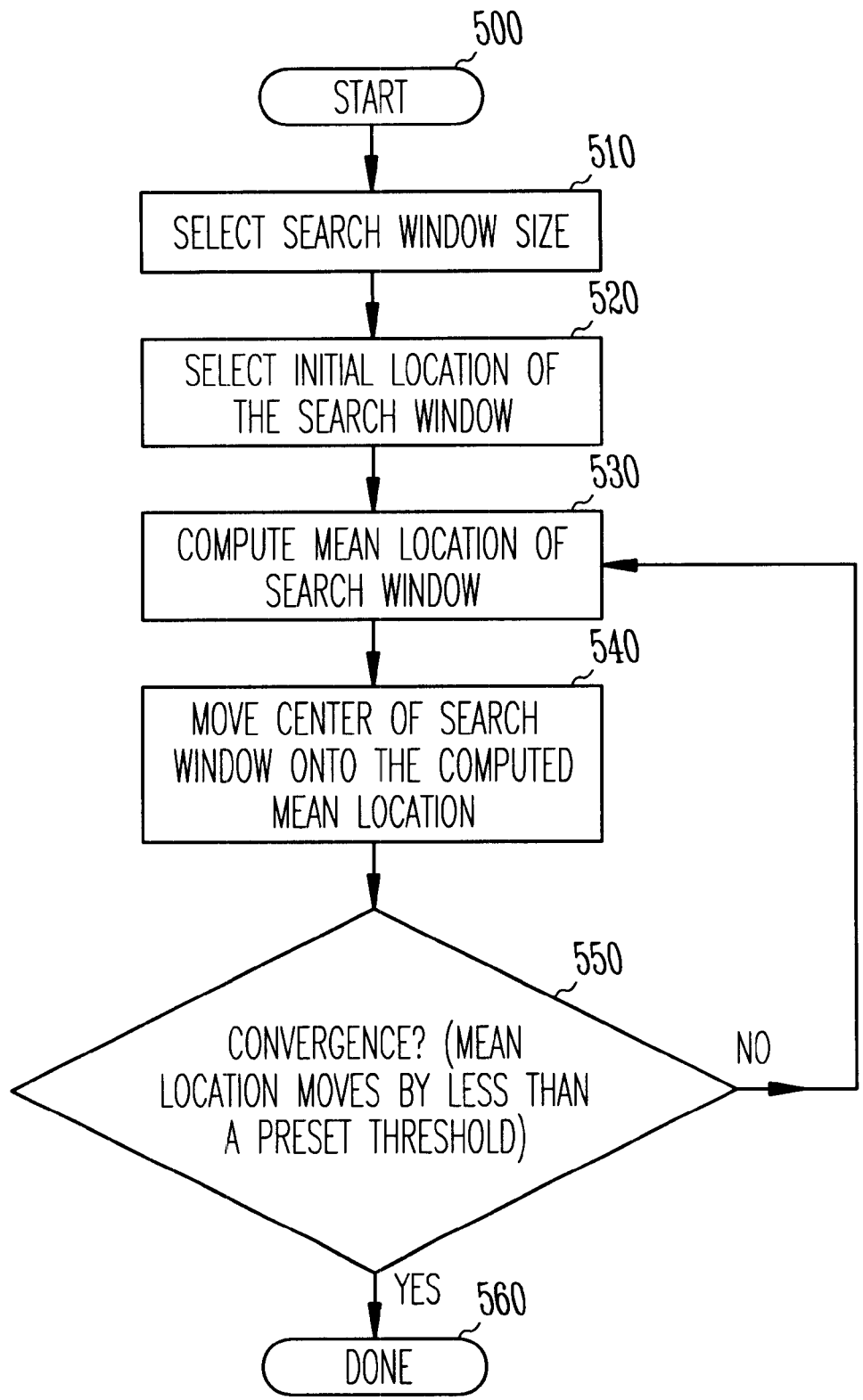
FIG. 5 illustrates a flow diagram describing the operation of the mean shift method.

FIG. 5 graphically illustrates how the standard mean shift method operates. Initially, at steps 510 and 520, an initial search window size and initial search window location are selected. The method then computes the "mean" location of the search window at step 530. At step 540, the center of the search window is moved onto the mean location that was computed in step 530. At step 550, the method determines if it has converged upon the center of the probability distribution. This can be done by determine if the search was moved by a value less than a preset threshold value. If the mean shift method has converged, then it is done. If the mean shift method has not converged then the method returns to step 530 where the mean of the new search window location is calculated.

Figure 6:
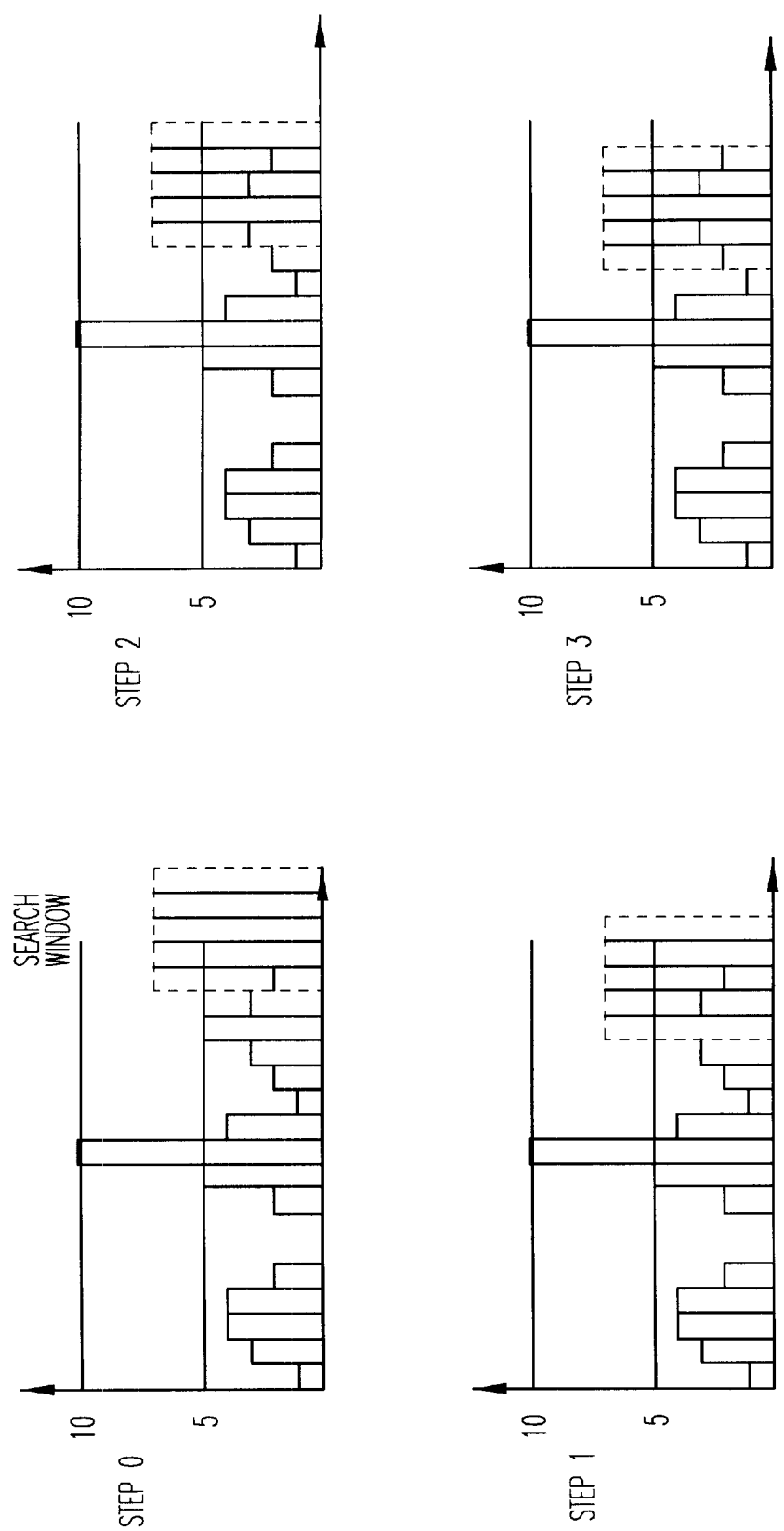
FIG. 6 illustrates an example of a continuously adaptive mean shift method applied to one dimensional data.

An example of the mean shift method in operation is presented in FIG. 6. To simplify the explanation, the example is provided using a one dimension slice of a two dimensional probability distribution. However, the same principles apply for a two or more dimensional probability distribution. Referring to step 0 of FIG. 6, a five sample wide search window is placed at an initial location. After a first iteration of the method, the search window is moved to the left as illustrated in step 1 of FIG. 6. The search window was moved left since the mean location of the search window samples was left of the initial search window location. After a second iteration, the search window is again moved left as illustrated in step 2. The search window was moved left since the mean location of the search window samples in step 1 is left of the center of the search window in step 1. After a third iteration, the search window again moves left. However, for all subsequent iterations, the search window will remain stationary (provided the distribution data does not change). Thus, by the third iteration, the mean shift method has converged.

To use the mean shift method for two dimensional image data, the following procedures are followed:

Find the zeroth moment:

$$M_{00} = \sum_x \sum_y I(x, y). \tag{1}$$

Find the first moment for x & y:

$$M_{10} = \sum_x \sum_y xI(x, y); \quad M_{01} = \sum_x \sum_y yI(x, y). \tag{2}$$

Then the mean location (the centroid) is:

$$x_c = \frac{M_{10}}{M_{00}}; \quad y_c = \frac{M_{01}}{M_{00}}. \tag{3}$$

Where I(x,y) is the image value at position (x,y) in the image, and x and y range over the search window.

The mean shift method disclosed with reference to FIG. 5 and FIG. 6 provides relatively good results, but it does have a few flaws. For example, for dynamically changing and moving probability distributions such as probability distributions derived from video sequences, there is no proper fixed search window size. Specifically, a small window might get caught tracking a user's nose or get lost entirely for large moments. A large search window might include a user and his hands as well as people in the background. Thus, if the distribution dynamically changes in time, then a static search window will not produce optimal results.

D. Object Tracking Using Continuously Adaptive Mean Shift

To improve upon the mean shift method, the present invention introduces a continuously adaptive mean shift method referred to as a CAMSHIFT method. The CAMSHIFT method dynamically adjusts the size of the search window to produce improved results. The dynamically adjusting search window allows the mean shift method to operate better in environments where the data changes dynamically.

Figure 7:
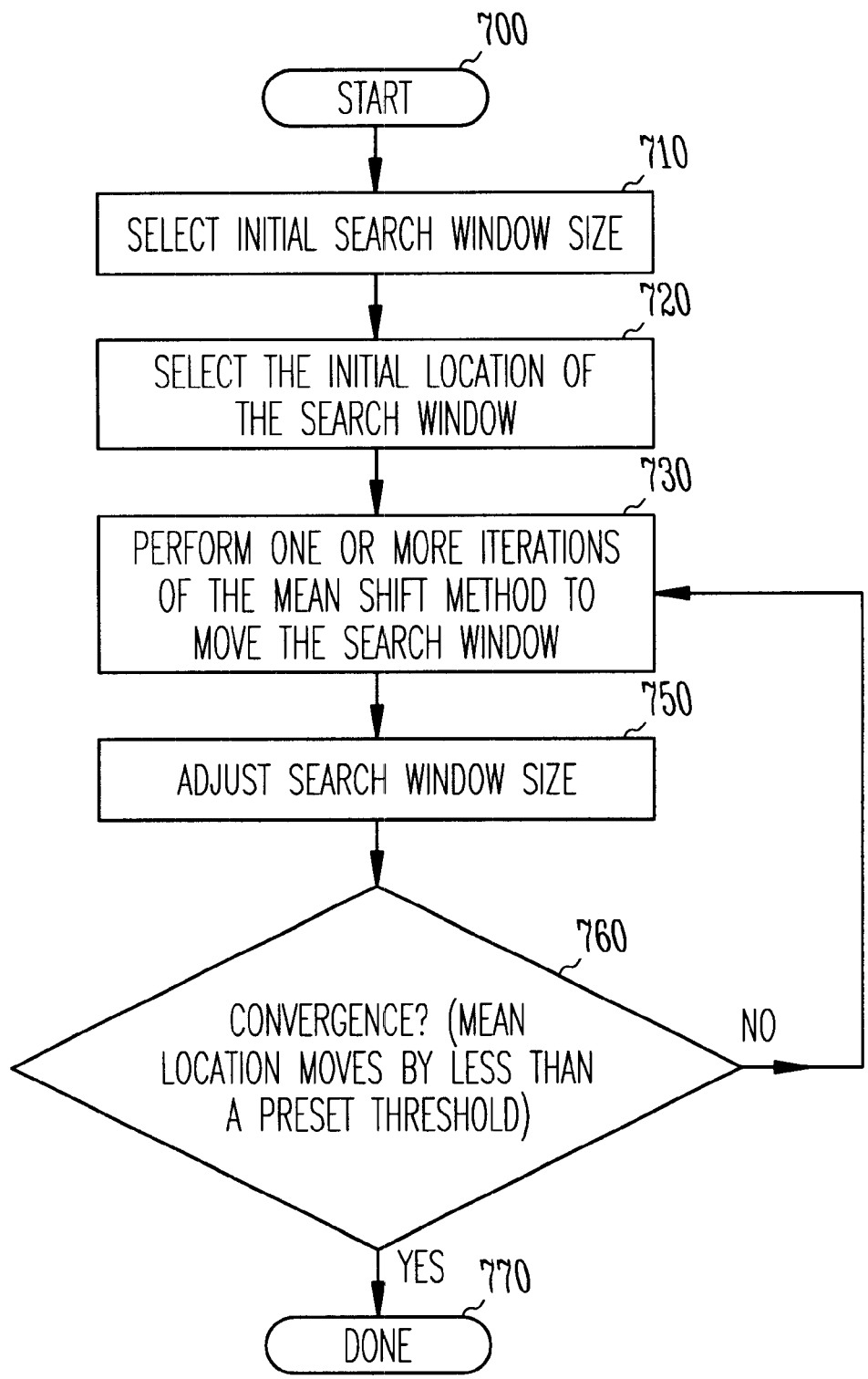
FIG. 7 illustrates a flow diagram describing the operation of the continuously adaptive mean shift method.
Figure 8A:
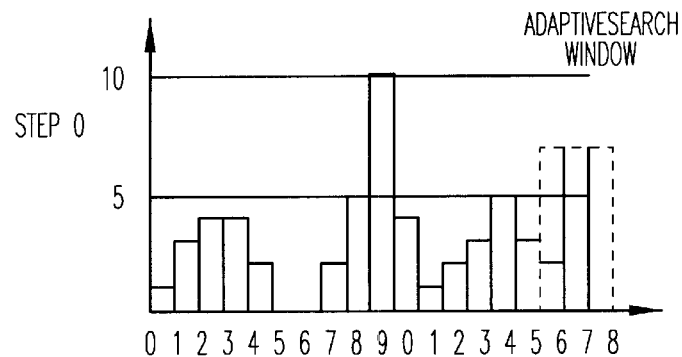
FIG. 8 illustrates example of the continuously adaptive mean shift method applied to one dimensional data.
Figure 8B:
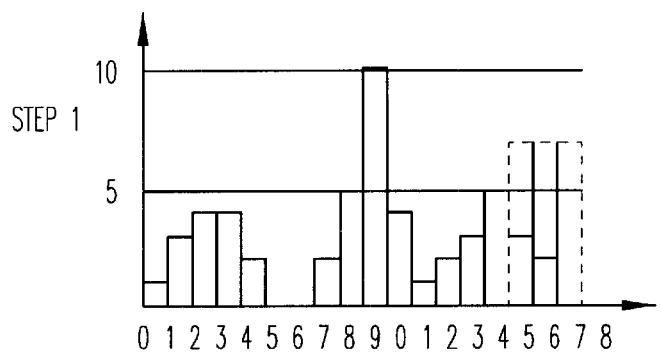
Figure 8C:
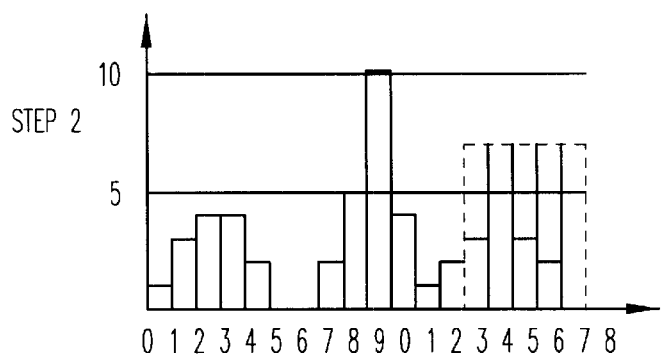
Figure 8D:
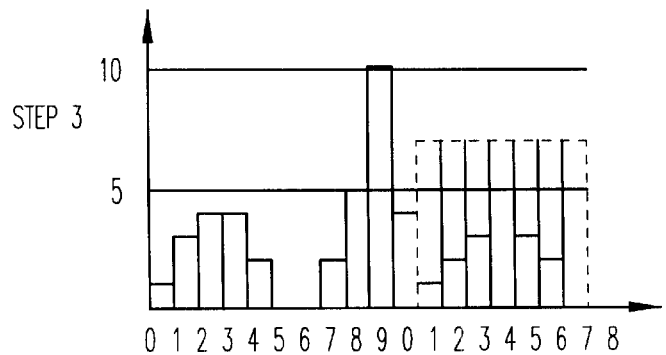
Figure 8E:
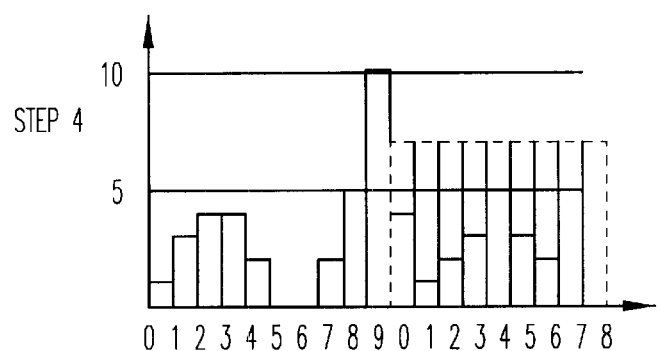
Figure 8F:
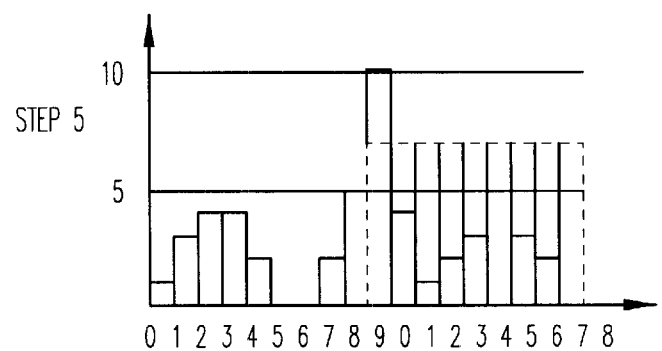
Figure 8G:
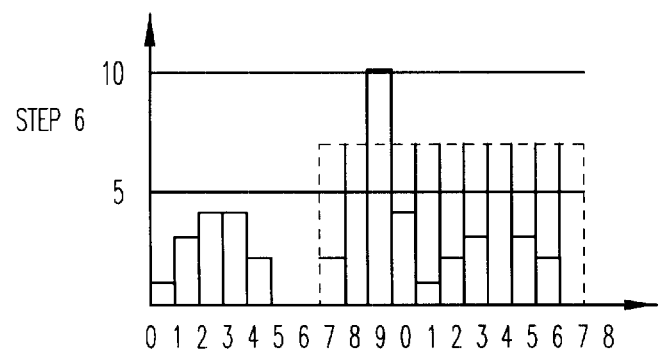
Figure 8H:
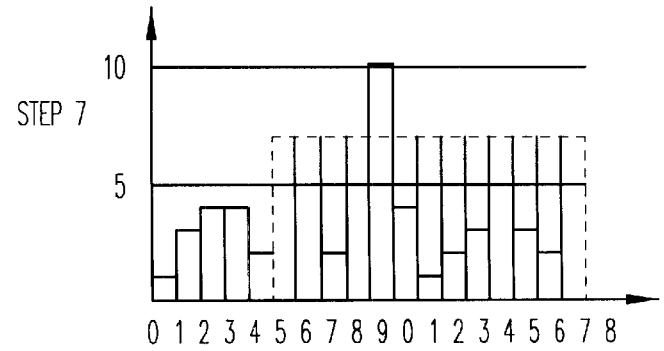

FIG. 7 graphically illustrates how the CAMSHIFT method of the present invention operates. At steps 710 and 720, an initial search window size and initial search window location are selected. The CAMSHIFT method performs one or more iterations of the mean shift method to move the search window at step 730. At step 750, the method adjusts the size of the search window. The size of the search window may be dependent upon information gathered about the data. Next, at step 760, the method determines if it has converged upon the center of the probability distribution. If the mean shift method has converged, then the method is done. If the CAMSHIFT method has not converged then the method returns to step 730 where the mean shift method is performed using the new search window location with the new search window size is calculated.

An example of the continuously adaptive mean shift method in operation is presented in FIG. 8. Again, to simplify the explanation, the example is provided using a one dimension slice of a two dimensional probability distribution. However, the same principles apply for a two or more dimensional distribution. In the example of FIG. 8, the continuously adaptive mean shift method adjusts the search window to a size that is proportional square root of the zeroth moment. Specifically, the continuously adaptive mean shift method in the example of FIG. 8 in two dimensions adjusts the search window to have a width and height of:

$$w = h = 2*\sqrt{M_{00}}. \tag{4}$$

Wherein $M_{00}$ is the zeroth moment of the data within the search window. (see equation 1.) For N dimensional distributions where N ranges from 1 to infinity, each side of the search window would be set to $$w = \alpha_i * M_{00}^{1/N} \tag{5}$$

Where $\alpha_i$ is a positive constant. However, other embodiments may use other methods of determining the search window size.

Referring to step 0 of FIG. 8, a three sample wide search window is placed at an initial location. After a first iteration of the method, the search window is moved to the left as illustrated in step 1 of FIG. 6. The search window was moved left since the mean location of the search window samples was left of the initial search window location. After a second iteration, the search window is again moved left as illustrated in step 2 since the mean location of the search window samples in step 1 is left of the center of the search window in step 1. However, it should also be noted that the size of the search window increased since the amount of data in the search window has increased. After a third iteration, the center of the search window again moves left and the search window size again increases. It can be seen in the subsequent iterations that the adaptive mean shift method adjusts the window size as it converges upon the mean of the data. Referring to step 7 of FIG. 8, the continuously adaptive mean shift method converges upon the mean of the contiguous data. It has been found that the continuously adaptive mean shift method with a search window width and height set equal to $2*\sqrt{M_{00}}$ will typically find the center of the largest connected region of a probability distribution, a great benefit for tracking one of multiple confusable objects.

E. Head Tracking Using Continuously Adaptive Mean Shift

Figure 9:
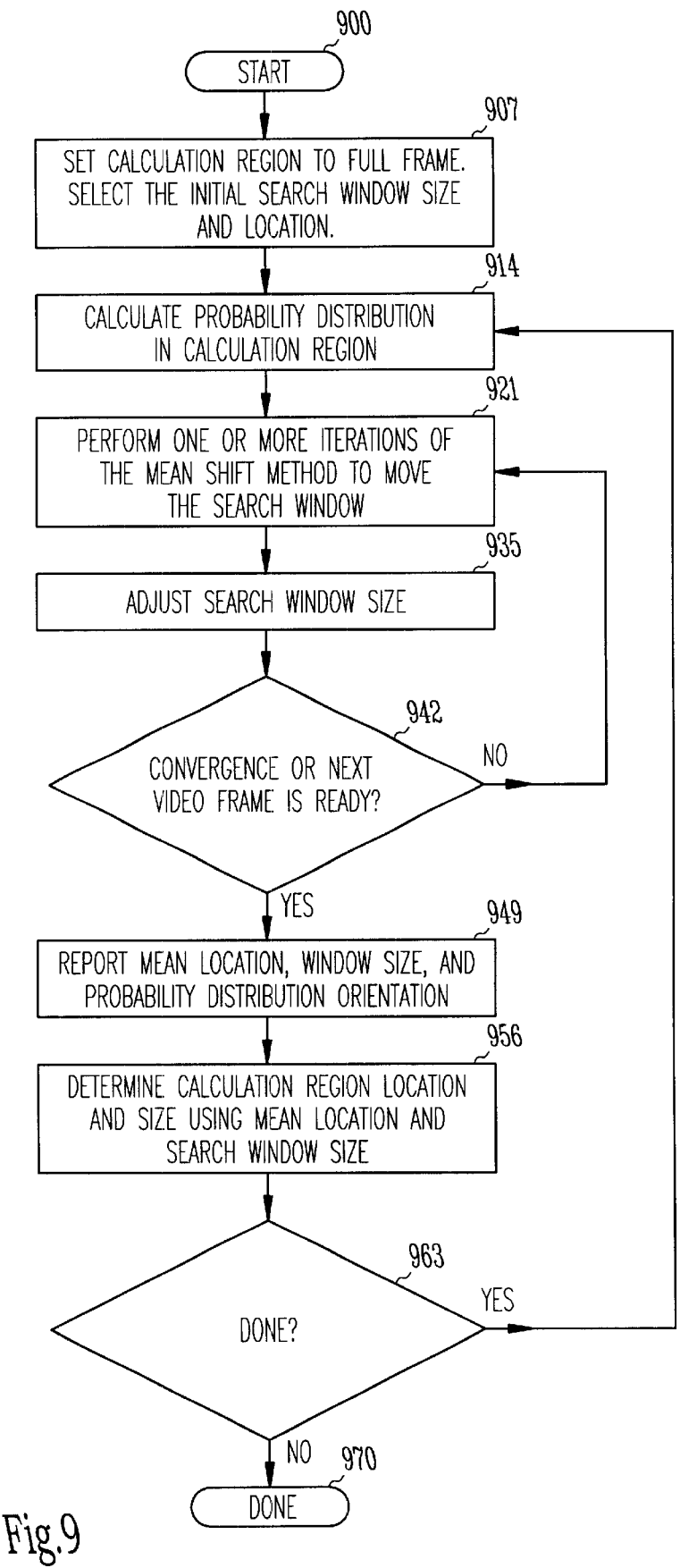
FIG. 9 illustrates a flow diagram describing the operation of a head tracker using the continuously adaptive mean shift method.

To provide an example usage of the continuously adaptive mean shift method, one specific embodiment of a head tracking system is provided. However, many variations exist. The example is provided with reference to FIG. 9, FIG. 10A and FIG. 10B.

To reduce the amount of data that needs to be processed, the head tracker uses a limited "calculation region" that defines the area that will be examined closely. Specifically, the calculation region is the area for which a probability distribution is calculated. Area outside of the calculation region is not operated upon. Referring to step 907 of FIG. 9, the head tracker initially sets the calculation region to include the entire video frame. The initial search window size and location is selected to capture a head that is substantially centered in the video frame. Again, the initial search window size can include the entire video frame. Thus, the present invention can be implemented without any initial search window size or search window location parameters that need to be determined.

Next, at step 914, the flesh hue probability distribution is calculated in the calculation region. During the first iteration, the probability distribution is calculated for the entire video frame. The continuously adaptive mean shift method is applied by steps 921, 935, and 942 to locate the region with the highest probability density. At step 949, the size and location of the search window are reported. This information can be used for tracking the head location and size. The size parameter can be used to determine a distance of the head from the camera.

Figure 10A:
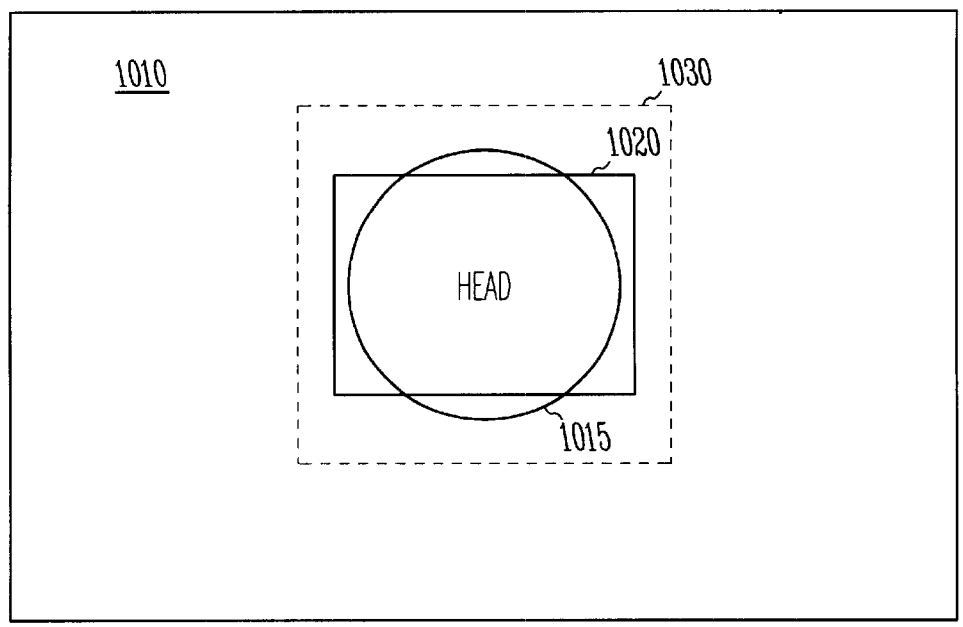
FIG. 10A illustrates a first diagram of a head within a video frame, a head tracker search window, and an calculation area used by the search window.
Figure 10B:
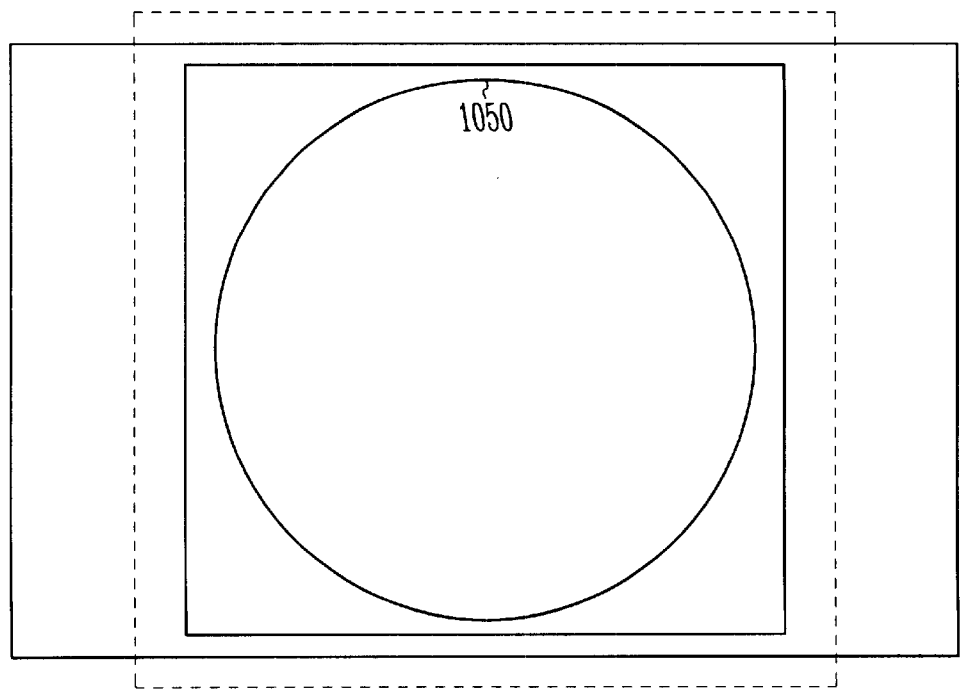
FIG. 10B illustrates a second diagram of a head within a video frame that is very close to the camera, a head tracker search window, and an calculation area used by the search window.

At step 956, the size and location of the search window are used to determine a new calculation region. The calculation region is the area 1030 centered around the search window 1020 as illustrated in FIG. 10A such that a flesh hue probability distribution will only be calculated for the area around the head. By using the size and location of the search window, the "lock" of the motion-tracker is reinforced on the object of interest. In the example of a head tracker, when a person is close to the camera as illustrated in FIG. 10B, the flesh probability distribution will be large and any movements they make will also be large in absolute number of pixels translated so the calculation region must be large. But when the person is far from the camera as illustrated in FIG. 10A, their flesh probability distribution will be small and even if the person moves quite fast the number of pixels that the person translates will be small since the person is so far from the camera, so the calculation region can be small. After determining the location of the new calculation region, the method returns to step 914 where the method calculates the probability distribution in the new calculation area. The method then proceeds to search for the area with the greatest probability destiny.

1. A Kickstart Method

To initially determine the size and location of the search window, other methods of object detection and tracking may be used. For example, in one embodiment, a motion difference is calculated for successive video frames. The center of the motion difference is then selected as the center of the search window since the center of the motion difference is likely to be a person in the image.

2. Search Window Sizing

In a digital embodiment such as digitized video images, the probability distributions are discrete. Since the methods of the present invention climb the gradient of a probability distribution, the minimum search window size must be greater than one in order to detect a gradient. Furthermore, in order to center the search window, the search window should be of odd size. Thus, for discrete distributions, the minimum window size is set at three. Also, as the method adapts the search window size, the size of the search window is rounded to the nearest odd number greater or equal to three in order to be able to center the search window. For tracking colored objects in video sequences, we adjust the search window size as described in equation 4.

3. Determining Orientation

After the probability distribution has been located by the search window, the orientation of the probability distribution can be determined. In the example of a flesh hue tracking system to locate a human head, the orientation of the head can be determined. To determine the probability distribution orientation, the second moment of the probability distribution is calculated. Equation 6 describes how a second moment is calculated.

Second moments are:

$$M_{20} = \sum_x \sum_y x^2 I(x, y); \quad M_{02} = \sum_x \sum_y y^2 I(x, y) \quad (6)$$

After determining the second moments of the probability distribution, the orientation of the probability distribution (the angle of the head) can be determined.

Then the object orientation (major axis) is:

$$\theta = \frac{\arctan\left(\frac{2\left(\frac{M_{11}}{M_{00}} - x_c y_c\right)}{\left(\frac{M_{20}}{M_{00}} - x_c^2\right) - \left(\frac{M_{20}}{M_{00}} - x_c^2\right)}\right)}{2} \quad (7)$$

In the embodiment of a head tracker, the orientation of the probability distribution is highly correlated with the orientation of the person's head.

F. Identifying Other Flesh Regions

The techniques described above to identify the size and location of a head in a video image can also be used to identify other regions of the image as well, such as regions containing a user's hands. These hand regions can be analyzed using pattern recognition techniques, described below, to identify the position of the hands in these regions, e.g., to recognize specific hand gestures. Further, control signals can be created based on recognized patterns or hand gestures to control the operation of an electronic system as described in more detail below in Part III.

To identify the location and size of a region containing an image of a hand, the CAMSHIFT method described above is employed. The CAMSHIFT method identifies the dominant flesh hue probability distribution in a video frame. This is typically a head. Alternatively, pattern recognition can be used on found flesh regions to determine which, if any, is the head. The location and size of the head region can then be stored. The head region can also be zeroed out for further processing of the video frame.

The CAMSHIFT method is applied to the video frame two more times in an attempt to find two flesh hue probability distributions that correspond to the hands. First, the modified image data with the head region removed is processed using the CAMSHIFT method. Again, the dominant flesh region remaining in the image is identified. This region is identified as a first hand region; pattern recognition can confirm this. If a second hand region is necessary in a particular application, e.g., the input requires a two-handed gesture, this process is repeated. The first hand region similarly is zeroed out for further processing of the image. The CAMSHIFT method is applied to the video frame with the head and first hand regions zeroed out. This locates a second hand region, if any, in the video frame.

II. Pattern Recognition

Histograms of image measures such as the gradient orientation of the tracked hand may be used to recognize gestures captured in the video image. It is noted that other image measures of the hand regions can also be used. For example, the output of other filters, color detection, edge orientations, and the like can be taken from the identified hand regions.

To perform pattern recognition on hand regions, a system is operated in two modes. First, the system operates in a training mode in which measures, e.g., gradient orientation histograms, taken from hand regions of a video frame are linked with identified gestures. The measure and the associated gesture are stored for later use. Next, the system operates in a performance mode. In performance mode, hand regions of video frames are compared with the stored hand regions to identify the gesture captured in the video frame; recognized gestures may be used for interface control.

A. Training Mode

An example of a pattern recognition system is described here with respect to FIG. 1. In training mode, user 110 provides a gesture that is captured by camera 120 and provided to computer system 157. User 110 further identifies the gesture as a model for a specified input to an electronic system through the use of mouse 155 or keyboard 153.

Computer system 157 is programmed to generate a specific measure or measures of the image from camera 120 and to store this data as a model associated with the specified input to an electronic system. In one embodiment, the measure of the image from camera 120 is a gradient orientation histogram. In this embodiment, computer 157 is programmed to convolve the hand regions found by flesh tracking with X and Y Sobel derivative operators shown in Table 1 below.

TABLE 1

| X Derivative | | | Y Derivative | | |
|---|---|---|---|---|---|
| −1 | 0 | 1 | −1 | −2 | −1 |
| −2 | 0 | 2 | 0 | 0 | 0 |
| −1 | 0 | 1 | 1 | 2 | 1 |

It is noted that other operators can be used in place of the Sobel operators to create the histograms for pattern recognition. However, due to their simplicity, the Sobel operators have the advantage of rapid execution and of measures that are sufficiently distinctive for the gestures involved.

Next, the magnitude and angle at a pixel location in the hand region are calculated according to equations 8 and 9, respectively:

$$M(x,y) = \sqrt{S_x^2(x,y) + S_y^2(x,y)} \quad (8)$$

$$A(x, y) = \arctan\left(\frac{S_y(x, y)}{S_x(x, y)}\right) \quad (9)$$

In equations 8 and 9, the response at a pixel location (x,y) is represented as $S_x(x,y)$ to the X operator and $S_y(x,y)$ to the Y operator.

To further refine this model, a threshold $T_M$ is set equal to the mean of the magnitudes that were calculated for each pixel using equation 8. A histogram for the hand region is created from the orientation found at all pixels of the hand region that exceed the threshold $T_M$. This is the model for the hand region. The model can be based on other measures such as using both magnitude and angle calculations. The performance of the system is not very sensitive to the threshold $T_M$, which may also vary.

A model for another hand region can also be created using the data for the other hand region, if necessary. This allows the system to work with gestures using one or two hands.

Additional models are created using this same approach until a sufficient number of discriminable gesture models have been entered. At this point, the pattern recognition system can be used in performance mode.

B. Performance Mode

In performance mode, user 110 provides hand gesture inputs that are captured by camera 120. Computer system 157 identifies the hand regions in the captured video image using the CAMSHIFT method described above. Further, computer system 157 creates a histogram of the hand regions in the manner described above with respect to Test Mode and equations 8 and 9. Computer system 157 compares these histograms with the models stored during Test Mode to identify the gesture captured by camera 120.

Computer system 157 is programmed with one of a number of possible comparison routines. For example, computer system 157 can use a comparison routine based on Chi Square, Minimum Intersection, Bayesian probabilities, or correlation. Each of these comparison routines is described in turn below. It is understood that other appropriate comparison techniques can also be used.

1. Chi Square

Chi square is one of the most stable and reliable comparison techniques. However, it only establishes the order of the best to worst matches. It does not determine the quality of the matches since it fails the triangle inequality. Thus, when Chi Square is used, another technique, such as minimum intersection can be used to determine the quality of the match.

With Chi Square, the hand regions captured in the image from camera 120 are compared to a selected model according to either equation 10 or equation 11:

$$\chi_v^2(Q, V) = \sum_i \frac{(q_i - v_i)^2}{v_i} \quad (10)$$

$$\chi_{qv}^2(Q, V) = \sum_i \frac{(q_i - v_i)^2}{q_i + v_i} \quad (11)$$

In equation 10 and 11, Q represents the histogram of the model and it includes I "bins." In one embodiment, each bin represents four degrees of gradient orientation, e.g., the first bin is from 0 to 4 degrees. Thus, there are 90 bins. V represents the histogram of the hand region under consideration. Equations 10 and 11 compare the values in each of the associated bins for histograms of the model and the hand image under examination. This process is repeated for each of the possible models. The model with the best score is then analyzed with another technique, such as minimum intersection to determine whether it is sufficiently accurate. Equation 10 essentially assumes that the model V is an accurate model whereas equation 11 assumes that either the model V or the histogram of the image Q may be closer to the ideal gesture.

2. Minimum Intersection

The minimum intersection determines how well two histograms match. The minimum intersection is calculated according to equation 12:

$$\bigcap (Q, V) = \sum_i \min(q_i, v_i) \qquad (12)$$

According to equation 12, each bin the histograms for the model Q and the hand region of the captured image V are compared and the minimum of the two is added to a running total. This total is a measure of the intersection of the two histograms. When a model is identified as being a best fit using, for example, Chi Square, then the match is accepted if the minimum intersection is above a selected threshold.

3. Bayesian Probabilities

Comparisons using Bayesian Probabilities are as follows. A histogram can be represented as shown in equation 13:

$$H(M|o_i) \qquad (13)$$

Equation 13 is a mathematical representation of a histogram, H, for a set of measurements, M, given one of a number of possible objects, $o_i$. A rule of thumb, there should be as many training samples used in Training Mode as there are bins in the Histogram, H. Next, the Histogram is normalized by the number of training samples to get an approximation of the probability density as represented in equation 14:

$$p(M|o_i) \qquad (14)$$

Equation 14 is a mathematical representation of the probability density, p, for a set of measurements, M, given a selected object, $o_i$. For recognition purposes, the probability of an object given a measure is needed. To obtain a representation of this probability for an object given a single measure, $m_j$, Bayes rule is applied with equation 14 to produce equation 15.

$$p(o_i|m_j) = \frac{p(m_j|o_i)p(o_i)}{\sum_k p(m_j|o_k)p(o_k)} \qquad (15)$$

If all objects are equally likely, and the local measurements are spaced at least a local measurement apart so that the measurements are independent, then equation 15 can be modified to equation 16.

$$p(o_i|M) = \frac{\prod_j p(m_j|o_i)}{\sum_k \prod_j p(m_j|o_k)} \qquad (16)$$

Thus, equation 16 states that the probability density for an object, $o_i$, given a set of measures, M, can be derived based solely on the probability densities of the measurements given the various model objects.

4. Correlation

A final comparison technique is to determine correlation between a histogram of the model, Q, and a histogram of an image, V, captured by camera 120 using equation 17.

$$C(\hat{Q}, \hat{V}) = \frac{\sum_i \hat{q}_i \cdot \hat{v}_i}{\sqrt{\sum_i \hat{q}_i^2 * \sum_i \hat{v}_i^2}} \qquad (17)$$

In equation 17, both the model, Q, and the histogram to be tested, V, are mean centered according to equations 18 and 19 as follows:

$$\hat{q}_k = q_k - \mu_q \qquad (18)$$

$$\hat{v}_k = v_k - \mu_v \qquad (19)$$

In these equations, $\mu_q$ and $\mu_v$ are the mean (average) bin values for their respective histograms.

5. Invariant Moments

Statistical moments can be used to compare the "shape" of two objects; in this case the objects are two histograms. Equation 20 is used for analysis of moments for two dimensional objects. However, it is noted that invariant moments can be easily adapted to use with 1-dimensional and 3 or more dimensional objects.

$$m_{pq} = \sum_{-\infty}^{\infty} \sum_{-\infty}^{\infty} x^p y^q f(x, y) \qquad (20)$$

Equation 20 represents a two dimensional moment, $m_{pq}$, of order p+q, for discretized bin values, f(x,y). A complete moment set of order n consists of all moments, $m_{pq}$, such that $p+q \leq n$.

In this case, centered moments are used. The coordinates of the center of mass are defined through moments according to equation 21.

$$\hat{x} = \frac{m_{10}}{m_{00}} \qquad \hat{y} = \frac{m_{01}}{m_{00}} \qquad (21)$$

To center an object such that its center of mass is at the origin:

$$(\hat{x}, \hat{y}) = (0, 0) \qquad (22)$$

of the moments calculation, central moments are defined as follows:

$$\mu_{pq} = \sum_{-\infty}^{\infty} \sum_{-\infty}^{\infty} (x - \hat{x})^p (y - \hat{y})^q f(x, y) \qquad (23)$$

It is noted that central moments are translation invariant.

The use of moments for image analysis was introduced by M. Hu in 1962 in Hu, M., *Visual Pattern Recognition by Moment Invariants*, IRE Transactions on Information Theory, 8:2, pp. 179–187, 1962. Rather than use moments for image analysis, these moments can be used for histogram comparison. To achieve scale invariance, central moments are normalized according to equation 24.

$$\eta_{pq} = \frac{\mu_{pq}}{\mu_{00}^{[(p+q)/2]+1}} \qquad (24)$$

Since histogram measures are subject to image noise, only moments up to third order are considered. There are ten moments up to third order, but scale normalization and translation invariance fix three of these moments at constant values. Rotation invariance takes away one more degree of freedom leaving six independent dimensions. Hu uses seven variables however: six to span the six degrees of freedom, and a final seventh variable, the sign of which removes reflection invariance.

The seven moment based features proposed by Hu that are functions of normalized moments up to third order are shown in equations 25–31:

$$\phi_1 = \eta_{20} + \eta_{02} \tag{25}$$

$$\phi_2 = (\eta_{20} - \eta_{02})^2 + 4\eta_{11}^2 \tag{26}$$

$$\phi_3 = (\eta_{30} - 3\eta_{12})^2 + (3\eta_{21} - \eta_{03})^2 \tag{2}$$

$$\phi_4 = (\eta_{30} + \eta_{12})^2 + (\eta_{21} + \eta_{03})^2 \tag{28}$$

$$\phi_5 = (\eta_{30} - 3\eta_{12})(\eta_{30} + \eta_{12})[(\eta_{03} + \eta_{12})^2 - 3(\eta_{21} + \eta_{03})^2] + (3\eta_{21} - \eta_{03})(\eta_{21} + \eta_{03})[3(\eta_{30} + \eta_{12})^2 - (\eta_{21} + \eta_{03})^2] \tag{29}$$

$$\phi_6 = (\eta_{20} - \eta_{02})[(\eta_{30} + \eta_{12})^2 - (\eta_{21} + \eta_{03})^2] + 4\eta_{11}(\eta_{30} + \eta_{12})(\eta_{21} + \eta_{03}) \tag{30}$$

$$\phi_7 = (3\eta_{21} - \eta_{03})(\eta_{30} + \eta_{12})[(\eta_{30} + \eta_{12})^2 - 3(\eta_{21} + \eta_{03})^2] - (\eta_{30} - 3\eta_{12})(\eta_{21} + \eta_{03})[3(\eta_{30} + \eta_{12})^2 - (\eta_{21} + \eta_{03})^2] \tag{31}$$

Equations 25 and 26 provide scale and translation independence. Equations 27–30 ensure rotation with reflection invariance. Equation 31 provides reflection discrimination in sign.

Each of these comparison techniques have been described, by way of example, in terms of a one dimensional histogram. It is understood that these equations can be appropriately modified to work with higher dimensional histograms.

III. Video Navigation System

Figure 11:
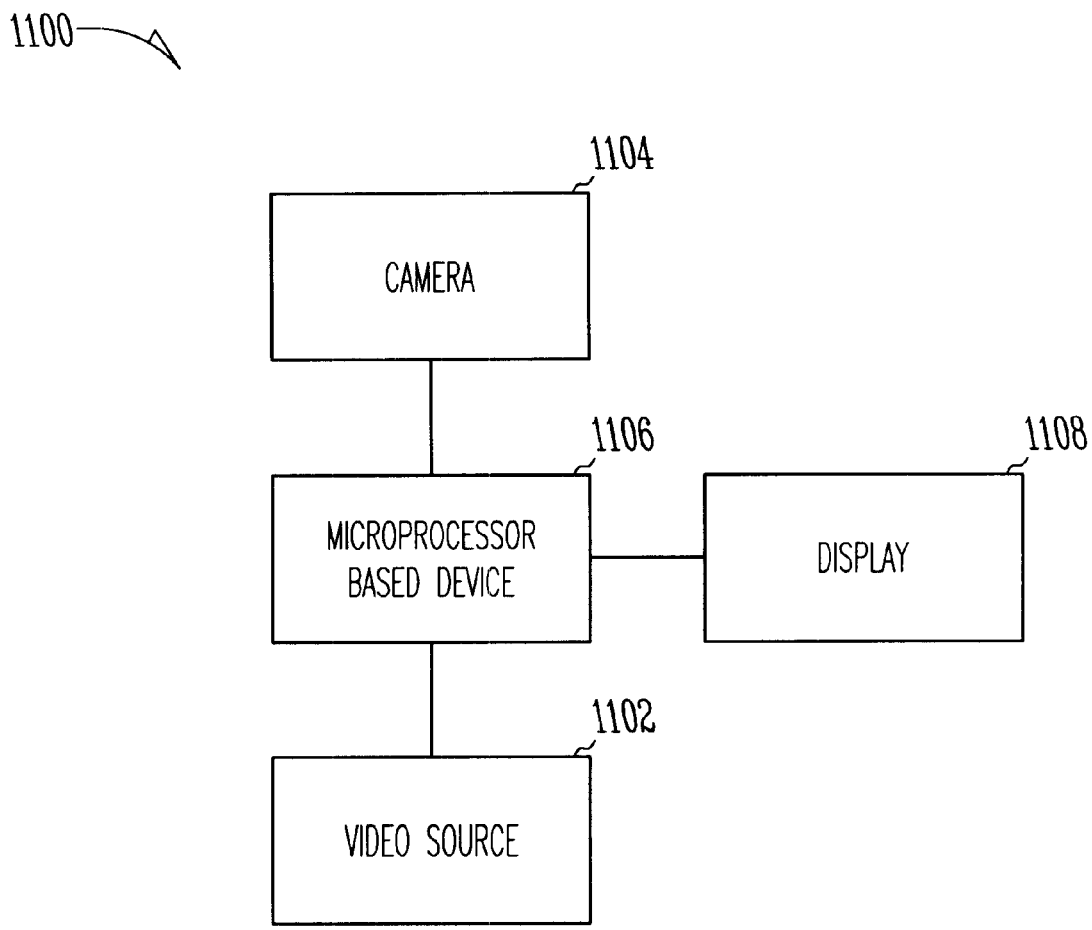
FIG. 11 is a block diagram of an illustrative embodiment of a system with a gesture recognition interface according to the teachings of the present invention.

FIG. 11 is a block diagram of an embodiment of a video navigation system 1100 with a user interface that tracks and recognizes patterns, such as hand gestures, to control the operation of video source 1102. The user interface is implemented using camera 1104 and microprocessor based device 1106 to implement the techniques described above to track regions in an image and recognize patterns within the tracked regions.

System 1100 analyzes the content of video source 1102 to build a video summary that can be used as a table of contents for the video source. A user then uses specified hand gestures that are captured by camera 1104 and analyzed by microprocessor based device 1106 to cause system 1100 to navigate across the video information of video source 1102 for display on display 1108.

A. Content Analysis

The fundamental unit of film is a "shot." Each shot is captured between a "record" and "stop" camera operation. At the next level, a "scene" is composed of a collection of shots depicting the same locale or event. Finally, scenes are grouped together into "stories." Since films and television programming are composed of shots, scenes and stories, it is best that system 1100 automatically extract its video summary in a similar hierarchy. This aspect of system 1100 seeks to automate, or at least assist, the identification of meaningful units of video and the characterization of these units.

1. Shot Detection

Shot detection is the process of automatic detection of transitions from one shot to another. There are two types of shot boundaries: abrupt and gradual. The basic principle to locate shot boundaries is to compare successive frames and determine where there are significant differences. Abrupt transitions most often give rise to large differences in both the luminance values and color histograms of video frames. Thus, abrupt transitions are easier to locate. Gradual transitions, e.g., fade-in or fade-out, are mode difficult to detect. This is not only due to the absence of significant differences, but also because the boundaries may not be precisely located.

Techniques used to determine the boundaries can be based on global thresholding or relative thresholding in a local window of frames. In addition, the detection can be done on compressed video without full decompression. Compressed video processing can be achieved by fast extraction of spatially reduced image sequence from MPEG compressed video. Each DC image is obtained from block-wise averages of an 8-by-8 block of the image. The extraction of DC images does not require full decompression of the compressed video. Further, the DC images retain most of the essential "global" information. Algorithms for this process are described in B. L. Yeo, *Rapid Scene Analysis on Compressed Videos,* IEEE Trans. on Circuits and Systems for Video Technology, Vol. 5, No. 6, pp. 533–544, December 1995.

2. Finding Scenes

In the next level, the shots are analyzed to group a number of shots together to form a scene. The shots are grouped using time-constrained clustering. In time constrained clustering, shots of similar visual content are grouped together into the same cluster and share the same label, provided that they are not too far apart from each other in time. In other words, time-constrained clustering takes into account both visual characteristics and temporal locality of shots. Time-constrained clustering is described in more detail in Yeung, M. M., et al., *Time Constrained Clustering for Segmentation of Video Story Units,* Proceedings, International Conference on Pattern Recognition, Vol. C, pp. 375–380, August 1996.

Scene Transition Graphs (STGs) are used to model clusters as nodes and the transitions in time as edges. STGs are described in Yeung, M. M., et al., *Video Browsing Using Clustering and Scene Transitions on Compressed Sequences,* SPIE Vol. 2417, Multimedia Computing and Networking 1995, pp. 399–413, February 1995. The STG, when combined with time-constrained clustering, allows the segmentation of meaningful story units or scene through the identification of cut-edges in the directed graph. The cut-edges reflect the transition from one scene to the next. The results of the segmentation can be visually represented using the STG that presents the flow of scenes from one to the next for navigation.

Figure 12:
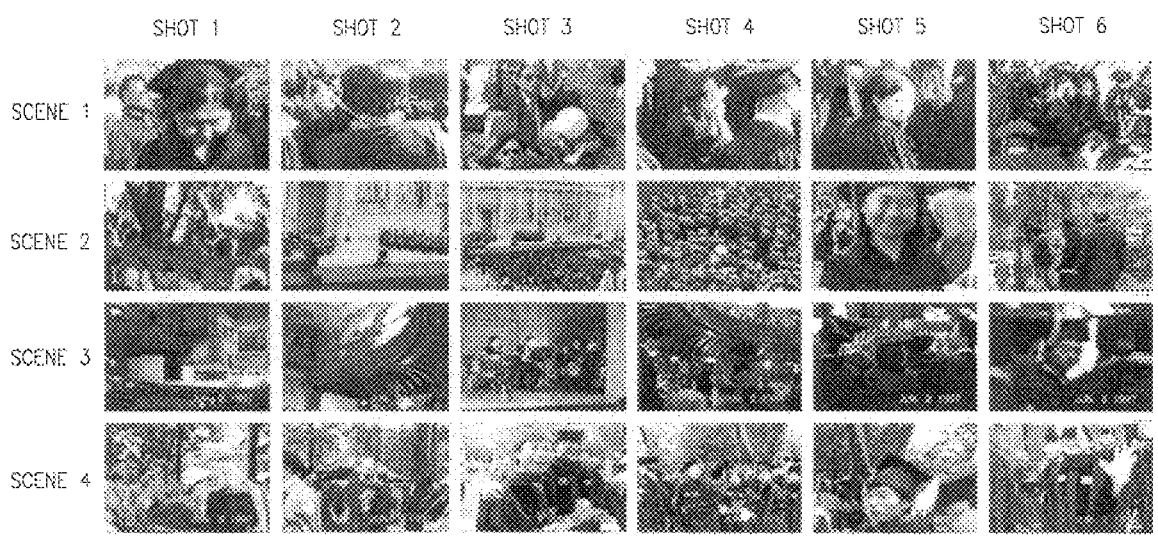
FIG. 12 is a block diagram that illustrates graphically an index of scenes and shots for a sample video source generated according to the teachings of the present invention.
Figure 13A:
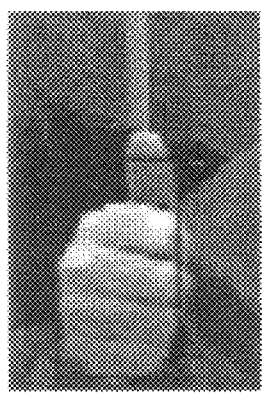
FIGS. 13A through 13H are images of hand gestures in for one embodiment of an interface for navigating across a video source according to the teachings of the present invention.
Figure 13B:
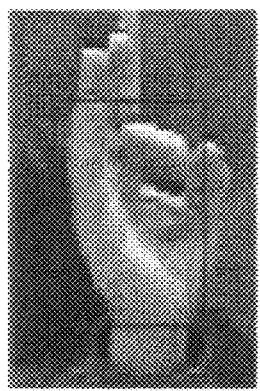
Figure 13C:
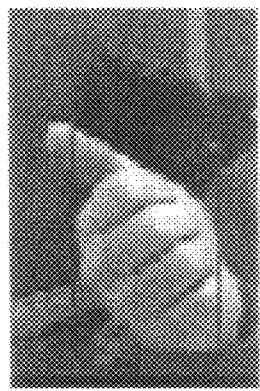
Figure 13D:
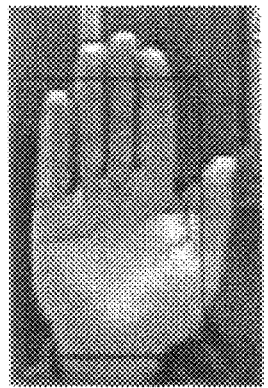
Figure 13E:
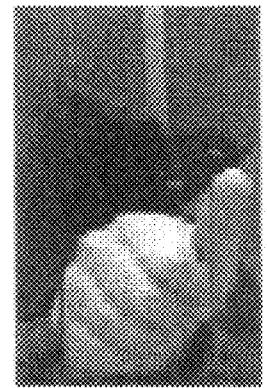
Figure 13F:
Figure 13G:
Figure 13H:
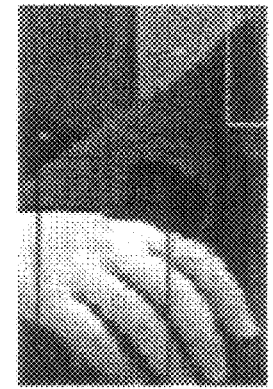

The output of this process is represented graphically in FIG. 12. In FIG. 12, a number of video frames are shown in a grid pattern. Each row of the grid corresponds to a scene and each column corresponds to a shot of the scene. For example, the top row of the grid represents a frame from each of six shots in a first scene. It is not necessary that each scene comprise the same number of shots.

B. Navigation

FIGS. 13A through 13H represent a number of hand gestures that system 1100 is trained to distinguish. Each of the hand gestures is associated with a particular command for browsing or navigating through the video information of video source 1102 derived by microprocessor based device 1106.

| Figure | Gesture | Function |
| --- | --- | --- |
| 13A | Thumb up | Step to previous scene |
| 13B | OK | Step to next scene |
| 13C | Thumb left | Step to previous shot |
| 13D | Stop | Step to next shot |
| 13E | Thumb right | Stop playing video |
| 13F | Peace | Play video in the selection |
| 13G | Fingers down | Jump to current scene |
| 13H | Fingers to side | Do nothing |

It is noted that these gestures and functions are provided by way of example and not by way of limitation. Other gestures and functions can be used so long as the gestures produce sufficiently distinct histograms for recognition by system 1100. Gestures selected should involve minimal hand movement and minimal hand strain. The gestures should also attempt to minimize confusability through pose transitions. The neutral gesture (See FIG. 13H) should be easy to transition to from other hand gestures.

FIGS. 14A through 14E are screen shots that illustrate the operation of an embodiment of system 1100 for navigating across video information from a video source. System 100 may be implemented on a dual 300 MHZ Intel Pentium II processor system using DirectShow video filter graph from Microsoft Corporation with a Matrox capture card. Image processing libraries optimized for MMX technology from Intel Microcomputer Software Labs can also be used.

To make system 1100 more robust, two consecutive pose gestures must be recognized before microprocessor based device 1108 signals to implement the command or function associated with the gesture. This helps avoid spurious errors. Further, system 1100 suppresses pattern recognition during movement of the hand regions to avoid pose transition errors.

The screen shots in FIGS. 14A through 14E show images representing scenes along the left side of the screen. For example, boxes or windows 1402, 1404 and 1406 of FIG. 14A display images. Further, images corresponding to specific shots are shown across the top of the screen. For example, boxes or windows 1408, 1410, 1412, 1414, and 1416 in FIG. 14A. Finally, window 1420 is provided in the center of the screen to provide for playing a sequence of video images.

Figure 14A:
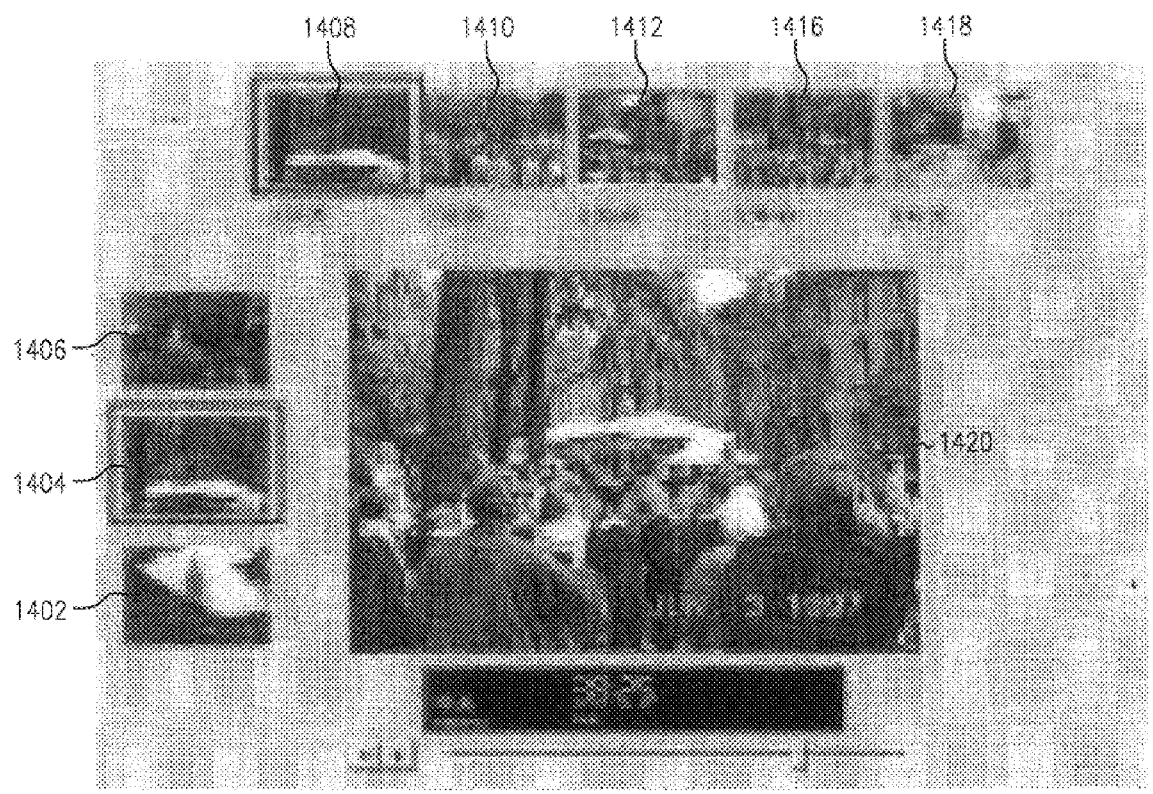
FIGS. 14A through 14E are screen shots that illustrate the operation of an interface for navigating across a video source according to the teachings of the present invention.
Figure 14B:
Figure 14C:
Figure 14D:
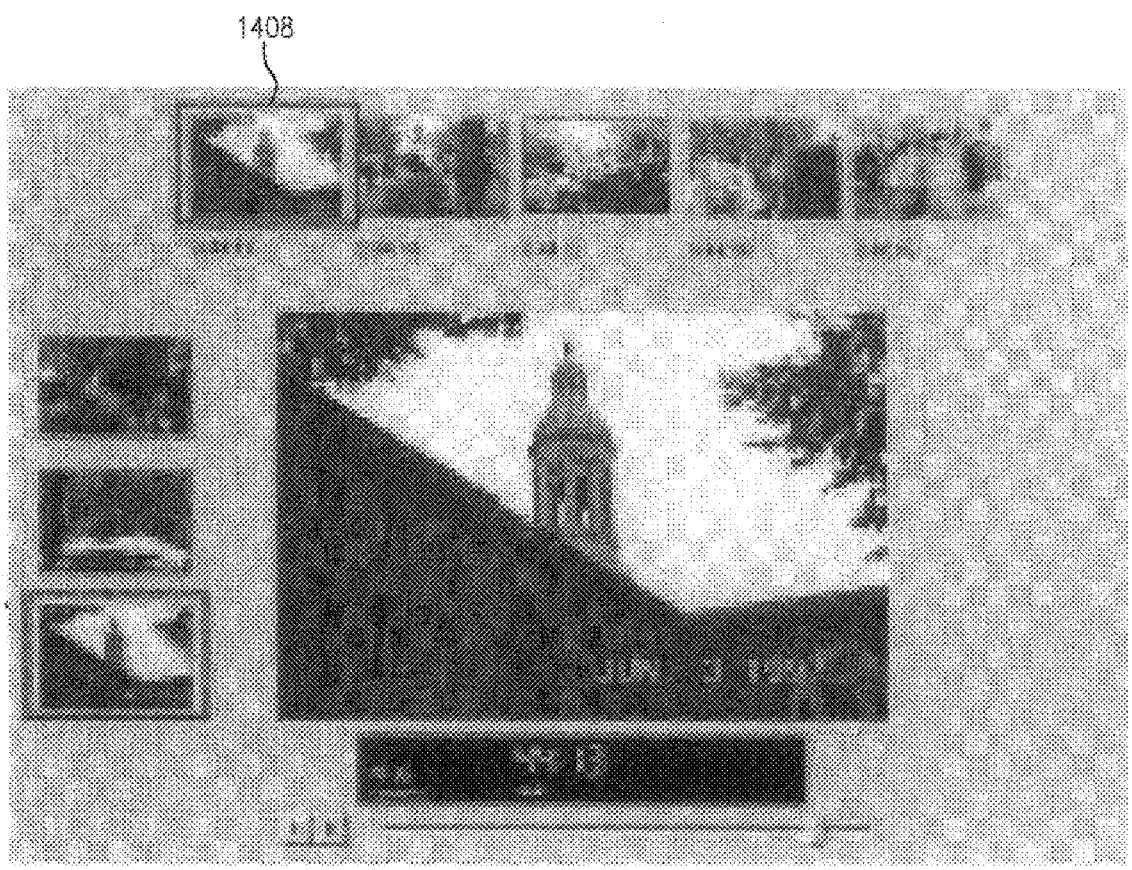
Figure 14E:
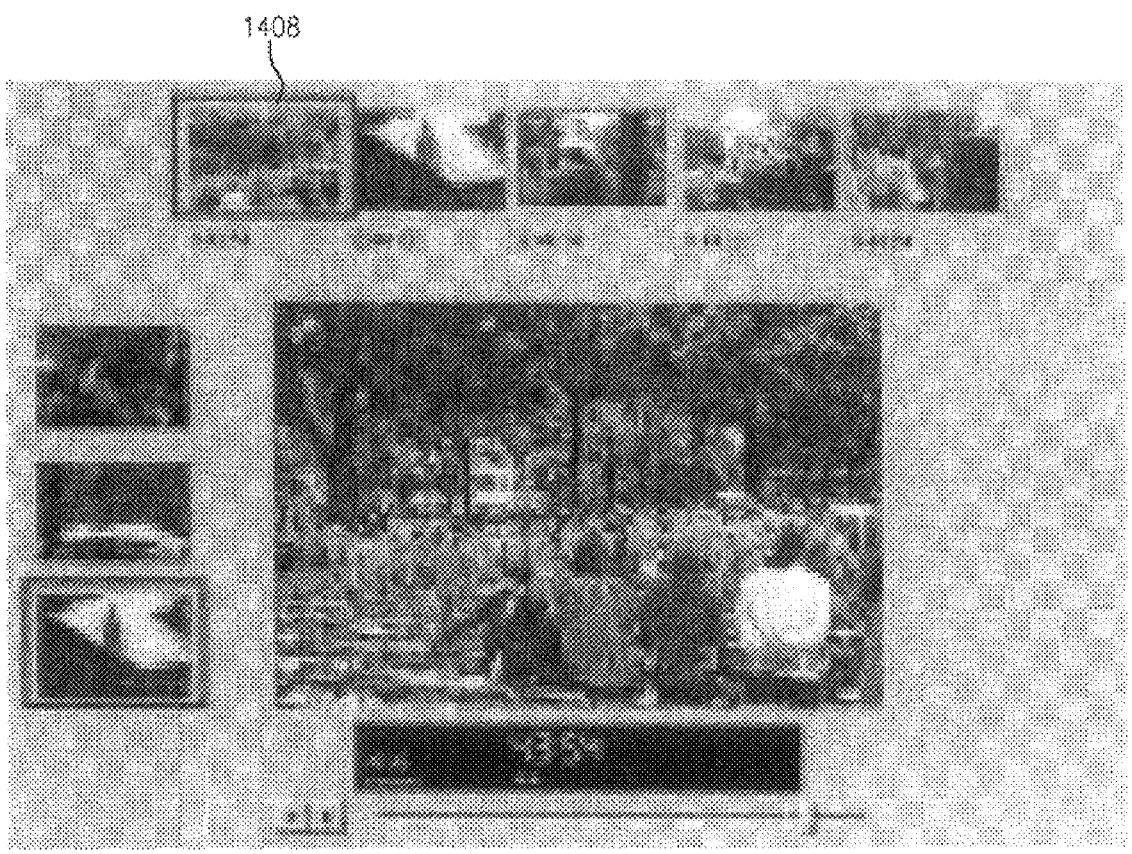

This example begins with FIG. 14A. The image in window 1408 represents the selected shot and the image in window 1404 represents the selected scene. The user provides a "Thumb right" gesture (FIG. 13E) to system 1100. System 1100 skips to the next shot as shown in FIG. 14B wherein the image in window 1410 is selected. Next, the user gives the "Fingers down" gesture. System 1100 skips to the next scene as indicated by the image in window 1402 in FIG. 14C. Next, the user gives the "Peace" gesture. System 1100 jumps to the current scene as indicated by the image in window 1408 in FIG. 14D. Finally, the user provides a "Thumbs left" gesture. System 1100 skips to the previous shot as indicated by the image in window 1408 of FIG. 14E.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the interface using gesture tracking and recognition can be used with systems other than video navigation, e.g., web browser, DTV, VCR, or TV control. Further, the system can also incorporate voice recognition in conjunction with gesture recognition.

What is claimed is:

1. A method for interfacing with an electronic system, the method comprising:
   receiving images from a camera;
   tracking a portion of at least one image from the camera using a mean shift method on a probability distribution;
   recognizing a pattern in the tracked portion of the at least one image; and
   selectively controlling the electronic system based on the recognized pattern.

2. The method of claim 1, wherein tracking a portion of the at least one image comprises tracking a portion of the at least one image that corresponds to a hand of the user.

3. The method of claim 1, wherein recognizing a pattern comprises recognizing a pattern that corresponds to a selected hand gesture.

4. The method of claim 1, wherein recognizing a pattern comprises recognizing a hand gesture based on a gradient orientation histogram.

5. The method of claim 1, wherein recognizing a pattern comprises:
   generating at least one histogram from the tracked portion of the at least one image from the camera;
   comparing the at least one histogram with histograms created based on known patterns; and
   selecting among the known patterns based on the comparisons.

6. The method of claim 5, wherein comparing the at least one histogram comprises comparing the at least one histogram using a Bayesian probability routine.

7. The method of claim 5, wherein comparing the at least one histogram comprises comparing the at least one histogram using a chi-square routine to determine the most likely pattern, and a minimum intersection routine to determine if the pattern exceeds a threshold.

8. The method of claim 5, wherein comparing the at least one histogram comprises comparing the at least one histogram using a correlation routine.

9. The method of claim 5, wherein generating at least one histogram comprises generating a gradient orientation histogram.

10. The method of claim 1, and further comprising training on a number of known patterns prior to recognizing a pattern.

11. The method of claim 1, wherein selectively controlling the electronic system comprises generating signals that control the display of video data on a display, wherein the video data includes a graphical representation of the content of a video source.

12. The method of claim 11, wherein the graphical representation of the content of the video source is generated by detecting shots within the video source and grouping the shots in the video source into scenes.

13. A user interface comprising:
   a camera for capturing images of at least a portion of the user; and
   a processor based device, coupled to the camera, that is operable to receive images from the camera, to track a portion of at least one image using a mean shift method on a probability distribution, to recognize a pattern in the tracked portion of the at least one image, and to generate signals to control the operation of an electronic device.

14. The user interface of claim 13, wherein the processor based device recognizes a pattern using a gradient orientation histogram of the tracked portion of the image.

15. The user interface of claim 13, wherein the processor based device selects a portion of the at least one image that corresponds to a hand of the user.

16. The user interface of claim 13, wherein the processor based device recognizes a pattern by generating at least one histogram from the tracked portion of the at least one image, comparing the at least one histogram with histograms created based on known patterns, and selecting among the known patterns based on the comparisons.

17. The user interface of claim 16, wherein the processor based device compares the at least one histogram using a chi-square routine to determine the most likely pattern, and a minimum intersection routine to determine if the pattern exceeds a threshold.

18. The user interface of claim 13, wherein the processor based device selectively controls the electronic system by generating signals that control the display of video data on a display, wherein the video data includes a graphical representation of the content of a video source.

19. A system with a pattern recognition interface, the system comprising:
a video source;
a camera that captures images at least a portion of a user;
a display for providing video information to the user; and
a processor based device, coupled to the video source, the camera and the display, that is operable to receive an image from the camera, to track a portion of the image using a mean shift method on a probability distribution, to recognize a pattern in the tracked portion of the image, and to selectively drive the display based on the recognized pattern.

20. The system of claim 19, wherein the processor based device recognizes a pattern using a gradient orientation histogram of the tracked portion of the image.

21. The system of claim 19, wherein the processor based device selects a portion of the at least one image that corresponds to a hand of the user.

22. The system of claim 19, wherein the processor based device recognizes a pattern by generating at least one histogram from the tracked portion of the at least one image, comparing the at least one histogram with histograms created based on known patterns, and selecting among the known patterns based on the comparisons.

23. The system of claim 22, wherein the processor based device compares the at least one histogram using a chi-square routine to determine the most likely pattern, and a minimum intersection routine to determine if the pattern exceeds a threshold.

24. The system of claim 19, wherein the processor based device selectively controls the electronic system by generating signals that control the display of video data on a display, wherein the video data includes a graphical representation of the content of a video source.

25. A method for navigating through video data from a video source, the method comprising:
displaying a graphical representation of the content of a video source on a display, the graphical representation of the content of the video source being generated based on an analysis of the frames of the video source;
receiving images from a camera;
tracking a portion of at least one image from the camera that corresponds to at least one hand of the user by using a mean shift method on a probability distribution;
recognizing a pattern in the tracked portion of the image that corresponds to a selected gesture, including:
generating at least one histogram from the tracked portion of the at least one image from the camera,
comparing the at least one histogram with histograms created based on known patterns, and
selecting among the known patterns based on the comparisons; and
controlling the display based on the recognized pattern.

26. The method of claim 25, wherein comparing the at least one histogram comprises comparing the at least one histogram using a Bayesian probability routine.

27. The method of claim 25, wherein comparing the at least one histogram comprises comparing the at least one histogram using a chi-square routine to determine the most likely pattern, and a minimum intersection routine to determine if the pattern exceeds a threshold.

28. The method of claim 25, wherein comparing the at least one histogram comprises comparing the at least one histogram using a correlation routine.

29. The method of claim 25, wherein generating at least one histogram comprises generating a gradient orientation histogram.

30. The method of claim 25, and further comprising training on a number of known patterns prior to recognizing a pattern.

* * * * *

UNITED STATES PATENT AND TRADEMARK OFFICE
CERTIFICATE OF CORRECTION

PATENT NO. : 6,363,160 B1
DATED : March 28, 2002
INVENTOR(S) : Gary R. Bradski, Boon-Lock Yeo and Minerva Ming-Yee Yeung It is certified that error appears in the above-identified patent and that said Letters Patent is hereby corrected as shown below:

Column 6,
Line 41, delete " $w = \alpha_i * M_{00}^{V/N}$ " and insert -- $w = \alpha_i * M_{00}^{\frac{1}{N}}$ --

Column 8,
Lines 30-34, delete " $\theta* = \frac{\arctan\left[\frac{2\left(\frac{M_{11}}{M_{00}} - x_c y_c\right)}{\left(\frac{M_{20}}{M_{00}} - x_c^2\right) - \left(\frac{M_{20}}{M_{00}} - x_c^2\right)}\right]}{2}$ " and insert -- $\theta = \frac{\arctan\left[\frac{2\left(\frac{M_{11}}{M_{00}} - x_c y_c\right)}{\left(\frac{M_{20}}{M_{00}} - x_c^2\right) - \left(\frac{M_{20}}{M_{00}} - y_c^2\right)}\right]}{2}$ --

Column 9,
Line 59, delete " $M(x,y) = \sqrt{S_x^2(x,y) + S_y^2(x,y)}$ " and insert -- $M(x,y) = \sqrt{S_x^2(x,y) + S_y^2(x,y)}$ --

Column 12,
Lines 2-7, delete " $c(\hat{Q},\hat{V}) = \frac{\sum_i \hat{q}_i \cdot \hat{v}_i}{\sqrt{\sum_i \hat{q}_i^2 \cdot \sum_i \hat{v}_i^2}}$ " and insert -- $c(\hat{Q},\hat{V}) = \frac{\sum_i \hat{q}_i \cdot \hat{v}_i}{\sqrt{\sum_i \hat{q}_i^2 \cdot \sum_i \hat{v}_i^2}}$ --

Column 13,
Line 14, delete " $\phi_2 = (\eta_{20} - \eta_{02})^2 + 4\eta_{11}^2$ " and insert -- $\phi_1 = (\eta_{20} - \eta_{02})^2 + 4\eta_{11}^2$ --

Line 15, delete equation No. "(2)" and insert -- (27) --, therefor.

Signed and Sealed this

Fourteenth Day of September, 2004

JON W. DUDAS
*Director of the United States Patent and Trademark Office*